A. MARR.
DIAPHRAGM OF TELEPHONIC RECEIVERS AND LIKE INSTRUMENTS.
APPLICATION FILED SEPT. 12, 1912.
1,061,766. Patented May 13, 1913.
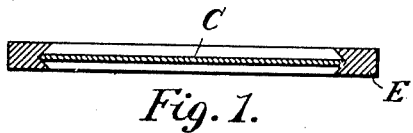
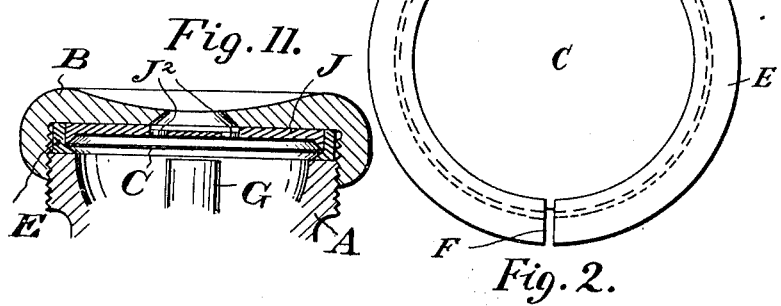
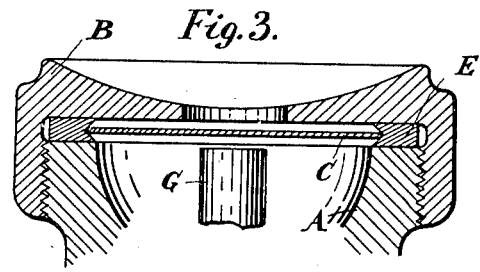
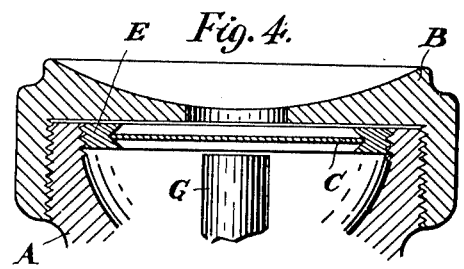
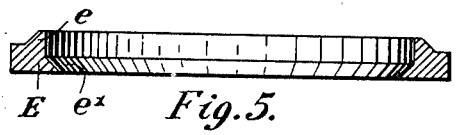
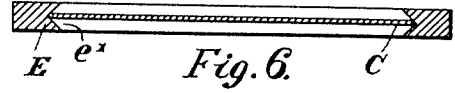
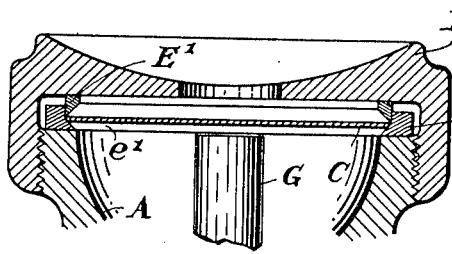
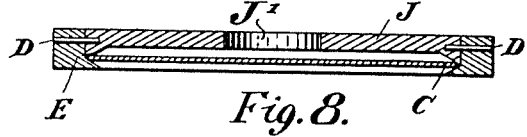
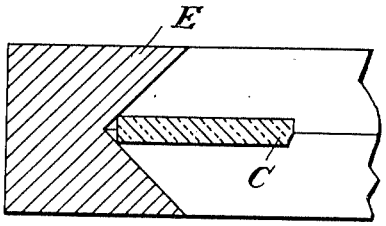
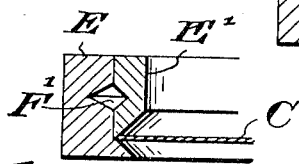
Inventor:
Alexander Marr

UNITED STATES PATENT OFFICE.

ALEXANDER MARR, OF MANCHESTER, ENGLAND.

DIAPHRAGM OF TELEPHONIC RECEIVERS AND LIKE INSTRUMENTS.

1,061,766.   Specification of Letters Patent.   Patented May 13, 1913.

Application filed September 12, 1912.  Serial No. 719,962.

*To all whom it may concern:*

Be it known that I, ALEXANDER MARR, a subject of the King of Great Britain and Ireland, and a resident of Manchester, in the county of Lancaster, England, have invented new and useful Improvements in and Relating to the Diaphragms of Telephonic Receivers and Like Instruments, of which the following is a specification.

This invention relates to improvements in the method of and means for mounting the diaphragms of telephonic receivers, transmitters, talking machines, and the like or other diaphragm instruments which diaphragms are supported at and around their peripheries only.

According to my invention a diaphragm is mounted in place by being secured around its edge or periphery between two opposed surfaces which come into contact only with the extreme peripheral corners of each face of the diaphragm.

The accompanying drawings illustrate various methods of and means for carrying my invention into effect and will now be referred to.

Figures 1 and 2 illustrate in cross section and in plan a ring or the like in which a diaphragm is secured according to this invention. Figs. 3 and 4 illustrate in section parts of a telephonic receiver and illustrate different ways of securing in place in such an instrument, the diaphragm and ring of Figs. 1 and 2. Fig. 5 shows in cross section a modified form of ring for receiving the diaphragm. Fig. 6 shows in cross section a diaphragm properly held in place in the modified ring of Fig. 5. Figs. 7, 8 and 10 show in section various further modifications of the mode of securing the diaphragm in place. Fig. 9 is an enlarged view in section of part of a diaphragm and ring combined according to this invention. Fig. 11 shows a still further modification.

In particularly describing how this invention is carried into effect I will refer first to Figs. 1, 2 and 9. E represents a brass ring having a shallow V-shaped groove turned around it on its inner face. The extreme diameter of this grooved part of the ring is such that the angle of the V will make tight contact with the peripheral corners of the diaphragm C as shown in Fig. 1, and in part to a larger scale, in Fig. 9. The ring E is divided as at F so that it can be sprung sufficiently open to allow the diaphragm to be put into or removed from place. This ring E carrying the diaphragm C may then be put in place between the body A and cap B of a receiver as shown in Fig. 3 and be clamped between them in the manner in which a diaphragm is at present usually clamped. The diaphragm is and remains supported by the extreme peripheral corners of its faces only, and has the greatest freedom and amplitude of vibration.

Fig. 4 represents another method of combining a diaphragm carrying ring with a receiver. In this arrangement the exterior of the ring E is screw threaded and screws into a correspondingly screw threaded portion formed in the outer end of the body A. This screwed mode of attachment permits the easy and simple adjustment of the diaphragm relatively to the magnet pole G. The ring may be formed on its upper face with holes for engagement by any suitable tool for rotating it.

When a divided ring such as is shown in Fig. 2 is employed to hold the diaphragm, it may be secured in its closed or gripping position by having its ends soldered together or otherwise secured.

An undivided ring having a shallow V groove to grip the diaphragm may be sufficiently expanded by heat to enable it to be fitted over and around the diaphragm.

In Fig. 5 is illustrated another form of ring E in which the grip illustrated to a large scale in Fig. 9 will eventually be obtained on the diaphragm. This ring is formed in its inner surface with a cylindrical part $e$ which rises upward from what, in Figs. 1 and 9, is the bottom of the angle of the V shaped groove. This cylindrical part is of a diameter sufficient to allow the diaphragm to be put into place and rest upon the upper portion of the coned or contracted portion $e^1$ of the ring. When the diaphragm is so in place the upper or cylindrical part of the ring, (which has a surrounding portion properly formed for the purpose) is pressed or spun over so that in conjunction with the coned part $e^1$ it eventually forms a V shaped groove around the inner surface of the ring, in which groove the periphery of the ring is securely held in the manner illustrated by Figs. 1 and 9. See Fig. 6. The ring E of Figs. 5 and 6 is not divided.

Another mode of securing a diaphragm in place in a ring which is formed with a lower coned portion and a parallel cylindrical upper portion as shown in Fig. 5 is illustrated in Fig. 7. Here the diaphragm is laid in place on the greatest diameter of the coned portion $e^1$ and another ring $E^1$ provided with an inner surface which is reversely coned is slipped into the cylindrical portion of the ring E. The peripheral corners of the faces of the diaphragm are gripped between the opposed conical portions of the rings E $E^1$ as shown in Fig. 7, a similar grip being obtained to that shown in the large scale of Fig. 9.

The portions E and $E^1$ of the ring may be soldered together to maintain the proper grip on the diaphragm, or the grip may be maintained by the pressure of the screw cap of the instrument.

With a diaphragm held between two ring members as shown in Fig. 7 it is preferred to place a definite weight upon the top ring member $E^1$ while it is loose and separate from the lower one E and then to secure the two members together while the top member is so weighted. As shown in Fig. 8 the top member may form a plate J extending over and covering the diaphragm C except for a sound hole $J^1$ in the center. As shown in Fig. 8 the two ring components are secured together by pins D.

In Fig. 10 the two ring components are shown as having grooves F' formed on their adjacent surfaces. When the components are in the positions shown the single groove F' produced can be filled with cement poured through a suitable hole. When the cement sets the components are locked together.

In the modification shown in Fig. 11 the plate J of the top ring component has a ring of small holes $J^2$ bored through it. The cap B has an inwardly expanding central sound hole which embraces the ring or holes $J^2$.

The end of the magnet pole G in a telephonic receiver in which the improved method of and means for mounting a diaphragm are employed may be made spherically concave so as to be about concentric with the curve assumed by the diaphragm when it is in its nearest position to the magnet.

The edge of the diaphragm is preferably turned or trued up so that it extends at right angles across the diaphragm from face to face and forms right angled corners to make tight contact with the beveled walls of the groove in which it is held. See the enlarged section in Fig. 9.

Although the description of the improved method of and means for mounting the diaphragm with reference to the drawings has only referred to the magnetic diaphragms of telephonic receivers it is to be understood that like methods and means are applicable to the diaphragms of all instruments which have vibratory diaphragms.

What I claim is:—

1. In combination, a vibratory diaphragm and an encircling holder which grips the diaphragm only around the extreme peripheral corners of both faces, substantially as set forth.

2. In combination, a vibratory diaphragm and an encircling holder therefor to grip the diaphragm only around the extreme peripheries of both faces, such encircling holder being a ring with a V shaped groove formed on its inner surface, substantially as set forth.

3. In combination, a vibratory diaphragm and an encircling holder therefor to grip the diaphragm only around the extreme peripheral corners of both faces, such encircling holder comprising two ring components one of which is fitted into the other, both being provided with beveled surfaces to make tight contact with said corners, substantially as set forth.

In witness whereof I have hereunto set my hand in the presence of two subscribing witnesses.

ALEXANDER MARR.

Witnesses:
LUTHER J. PARR,
CHAS. N. DANIELS.